United States Patent [19]

Norris

[11] 4,104,660

[45] Aug. 1, 1978

[54] CAMERA HAVING AUTOMATIC SHUTTER RECOCK BY FILM PROCESSING MECHANISM

[75] Inventor: Philip R. Norris, North Reading, Mass.

[73] Assignee: Polaroid Corporation, Cambridge, Mass.

[21] Appl. No.: 749,309

[22] Filed: Dec. 10, 1976

[51] Int. Cl.² ............... G03B 17/52; G03B 1/18; G03B 19/10; G03B 17/04
[52] U.S. Cl. .................. 354/171; 354/86; 354/173; 354/174; 354/187
[58] Field of Search ............ 354/171, 173, 204, 147, 354/288, 21, 84, 86, 187, 188, 189, 217, 218, 246, 247, 83, 174

[56] References Cited

U.S. PATENT DOCUMENTS

| | | | |
|---|---|---|---|
| 3,618,493 | 11/1971 | Erlichman | 354/171 X |
| 3,987,466 | 10/1976 | Murray, Jr. | 354/173 X |
| 4,000,500 | 12/1976 | Ivester et al. | 354/187 |
| 4,020,499 | 4/1977 | Vroom | 354/173 X |

FOREIGN PATENT DOCUMENTS 747,380  2/1944  Fed. Rep. of Germany ........... 354/204

*Primary Examiner*—Donald A. Griffin
*Attorney, Agent, or Firm*—David R. Thornton

[57] ABSTRACT

A camera of the type employing a removable film cartridge including a plurality of individual film units, which are exposed and ejected one by one to complete their development outside the camera, has a base, a motor carried on the base, and an exposure housing and an access door each pivotable with respect to the base. A shutter mechanism, movable between a cocked condition in which exposure can be initiated and a run down condition in which exposure is terminated, is automatically recocked and the film ejected following exposure termination. The gearing for the film ejection mechanism and the shutter recock mechanism, as well as the pivot points of the access door and the exposure housing, are so disposed with respect to each other and to the output gear as to permit smooth engagement and disengagement of the gears during pivotal motion of both door and housing, or either of them. The motor is started by a motor start switch actuated when the shutter mechanism reaches its run down condition; a motor power switch, actuated when the motor starts, maintains power to the motor during the recock operation.

27 Claims, 21 Drawing Figures

U.S. Patent  Aug. 1, 1978  Sheet 6 of 7  4,104,660
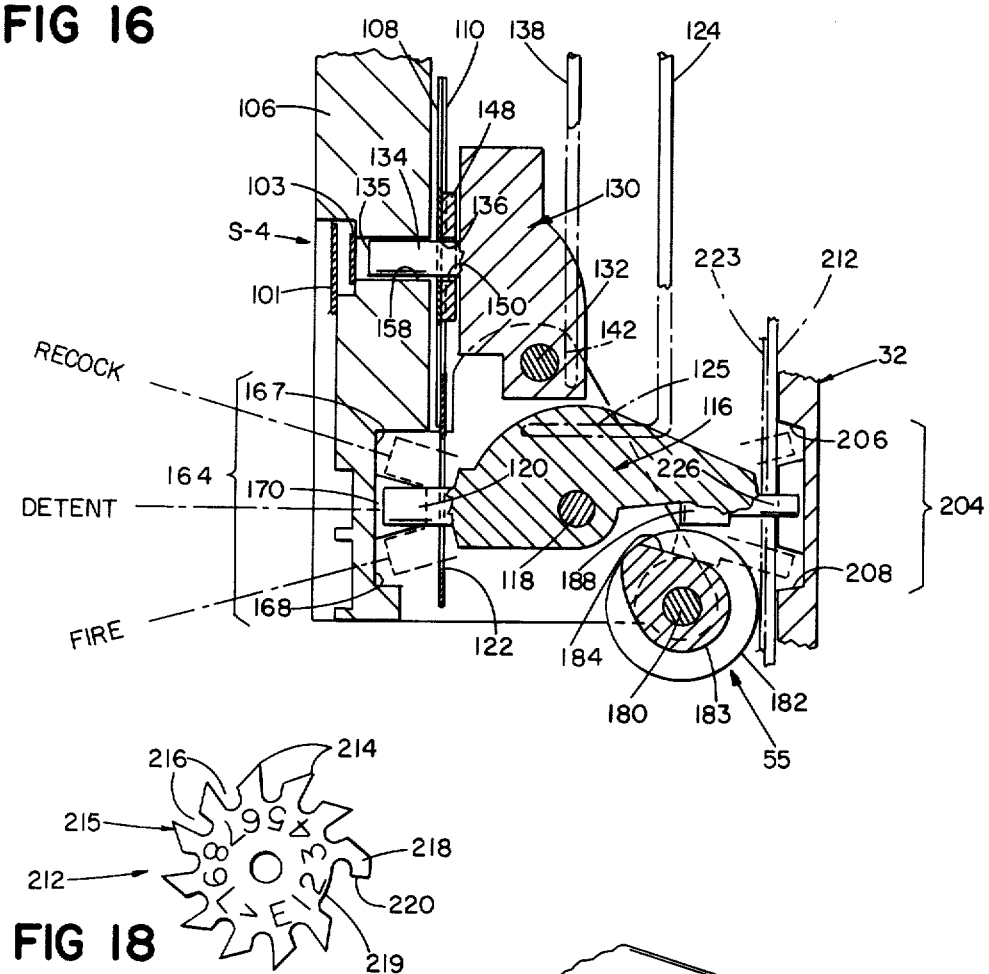
FIG 16
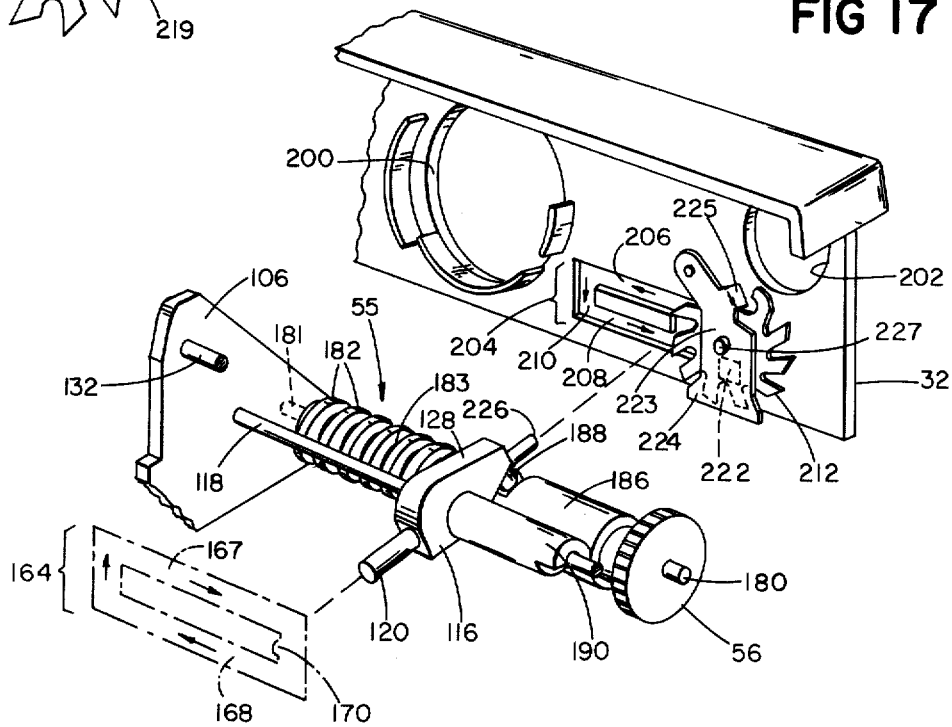
FIG 18
FIG 17

CAMERA HAVING AUTOMATIC SHUTTER RECOCK BY FILM PROCESSING MECHANISM

This invention relates to photography, and particularly to cameras of the type employing a removable film cartridge including a plurality of individual film units.

The camera to which the invention relates is foldable into a thin compact shape for storage or carrying. When expanded, and supplied with a cartridge including film units and a battery, the camera responds to the depression of a button to expose a film unit that is immediately ejected from the camera to complete its development outside the camera.

In the process of making an exposure in a camera of the kind described, the shutter is opened, a flash unit (if desired) is fired, and a photoelectrically timed exposure is made on the outermost film unit in the cartridge. The shutter is then closed, and a pick is actuated to advance the exposed film unit into engagement with a pair of processing rolls mounted at the front of the camera. The film unit is driven through the processing rolls under pressure to distribute a supply of film processing composition throughout a photo-sensitive laminar system in the film unit. At the same time, the shutter mechanism is automatically recocked for the next exposure.

An electric motor at the back of the camera drives a thin, elongated gear train extending down the side of the camera body. The gear train is connected to the pair of processing rolls, which extend across the front of the camera in position to receive the film unit advanced from the film pack, and transmits power from the motor at the back of the camera to the processing rolls at the front.

Collapsible cameras of the type described have heretofore generally been designed to employ sophisticated electronic logic to control their shutter release, shutter recock, and film processing operations, and have theretofore been correspondingly expensive. A collapsible camera of this type that eliminates many of the components such as solenoids and stepping motors, which require considerable power, and employs instead simplified electronics and mechanical devices, requiring less power, will be correspondingly less expensive than those of the prior art.

In addition, a camera that eliminates many electrical conductors, switches, cams, and soldered connections required in prior art designs will be less expensive to manufacture and will be simple and reliable in operation.

It is heretofore an object of the present invention to provide such a camera that employs a mechanical shutter release mechanism and provides a means to recock the shutter mechanism that requires little power from the battery. It is also an object of the invention to provide such a camera that has few electrical conductors between the motor and the exposure and processing mechanisms. Additionally, it is an object to provide such a camera that is relatively inexpensive to manufacture and that is simple and reliable in operation.

It is also desirable to provide such a camera that includes means to prevent firing of a flash unit when no film unit is available for exposure. It is a further object of this invention to provide such a feature.

In a first aspect of the invention, an improvement is provided in a camera of the type employing a removable film cartridge including a plurality of individual film units. The camera has a shutter mechanism including shutter blade means and shutter blade actuator means connected to the shutter blade means, the shutter blade means and shutter blade actuator means being movable between a first position defining a shutter mechanism cocked condition in which film exposure can be initiated and a second position defining a shutter mechanism run down condition in which exposure is terminated, and exposure biasing means biasing the shutter mechanism to its run down condition. Mechanical release means are connected to the shutter mechanism for releasing the shutter mechanism from its cocked condition, thereby initiating exposure travel of the shutter blade actuator means and exposure of a film unit. The camera also has a motor, processing rolls adjacent the shutter mechanism and drivable by the motor for ejecting an exposed film unit for development outside the camera, and motor start switch means connected to the motor and actuated by the shutter mechanism in its run down condition.

According to the invention, there is provided a worm, drive means mounted on the worm and actuated by the motor, follower means carried on the shutter blade actuator means and engageable with the worm for recocking travel of the shutter blade actuator means, and recock biasing means for biasing the shutter blade actuator follower means into engagement with the worm at the end of its exposure travel. The shutter mechanism is thereby automatically driven by the motor into its cocked condition during ejection of an exposed film unit.

In preferred embodiments, the camera has a shutter housing, and the shutter mechanism is mounted in the shutter housing.

According to the invention, the shutter housing provides actuator guide means including first and second parallel track portions. The actuator means engages with the guide means first track portion for exposure travel aligned with the first track portion. The camera further comprises a worm journaled in the shutter housing parallel with the processing rolls, and gear means mounted on the worm and concentric therewith, engageable with the processing rolls gear means. The shutter actuator means carries follower means engageable with the worm for recocking travel of the actuator means aligned with the second track portion. The camera further provides recock biasing means for biasing the actuator means into engagement with the second track portion and biasing the actuator follower means into engagement with the worm at the end of the exposure travel, and actuator detent means mounted on the shutter housing. The detent means engage the actuator means at the end of the recocking travel to disengage the follower from the worm and to hold the shutter blade actuator means in the first position, the mechanical release means being engageable with the detent means for releasing the actuator means to initiate an exposure.

The shutter mechanism is thereby automatically driven by the motor into the cocked condition during ejection of an exposed film unit.

A further improvement is provided when the camera of the invention further includes a receptacle for receiving a flash assembly, and a flash firing switch mounted in the shutter housing and actuated by the shutter actuator means during its exposure travel to fire the flash assembly. According to the invention, the shutter housing further provides a counter wheel rotatably mounted adjacent the actuator guide means and providing a plurality of teeth on its perimeter including a retaining tooth, the plurality being a number greater by one than the specific number of film units initially included in the film cartridge employed in the camera. The housing provides a counter aperture adjacent the wheel, and the wheel provides visible symbols indicating a film unit count including an initial symbol indicating the specific number and a final symbol indicating an exhausted film cartridge, each symbol being associated with a tooth; the counter aperture exposes a single symbol to view. The wheel is settable to place the initial symbol adjacent the counter aperture when a fresh film cartridge is employed in the camera.

The shutter actuator means further provides a wheel advance pin engageable with a tooth to advance the wheel during the actuator recock travel, the wheel advance pin being thereafter normally releasable past the tooth responsive to the mechanical release means to release the shutter actuator means for its exposure travel. The final symbol is associated with the retaining tooth, such that when the last film unit in the cartridge is exposed, the wheel advance pin engages the retaining tooth to advance the wheel to a position in which the final symbol is visible through the counter apertures, the advance pin being thereafter retained by the retaining tooth. The shutter actuator in thereby prevented from actuating the flash firing switch responsive to the mechanical release means when the film cartridge is exhausted.

In another aspect of the invention, a camera of the type employing a removable film cartridge including a plurality of individual film units has a base including forward and rear portions, a motor carried on the base, and an output gear carried on the base and driven by the motor.

An access door is pivotably connected to the base forward portion at a door pivot axis for pivotal movement between an open position permitting insertion or removal of a film cartridge, and a closed position for camera operation. A shutter mechanism housing is pivotably connected to the base forward portion at a housing pivot axis for pivotal movement of the housing between an erect position for camera operation and a collapsed position for storage. The access door closed position and shutter mechanism housing erect position together define a camera operating condition.

According to the invention, a processing roll gear is mounted on the access door and is drivably engaged with the output gear in the access door closed position, the processing roll gear having its axis forward of the door pivot axis. Shutter mechanism recock means carried in the housing include a recock gear having its axis forward of the housing pivot axis and of the processing roll means gear axis. The recock gear is drivably engaged with the processing roll gear in the camera operating condition. The door pivot axis, housing pivot axis, processing roll gear axis, and recock gear axis all lie in a common plane in the camera operating condition. The recock gear is thereby smoothly pivotable into and out of engagement with the processing roll gear during pivotal motion of the housing, the access door being in its closed position, and the processing roll gear is thereby smoothly pivotable into and out of engagement with the recock gear and with the output gear during pivotal motion of the access door, the housing being in its erect position.

In a third aspect of the invention, a camera of the type employing a removable film cartridge including a plurality of individual film units has a motor, film unit processing means driven by the motor, a cycle cam driven by the motor, and a motor power switch actuatable by the cycle cam to power the motor. The camera provides shutter means movable between a cocked position in which exposure can be initiated and a run down position in which exposure is terminated, biasing means biasing the shutter means to the run down position, mechanical release means for releasing the shutter means from its cocked position, and shutter recock means driven by the motor for removing the shutter means from its run down position to its cocked position.

A motor start switch is actuated by the shutter means at its run down position to start the motor. The cycle cam is driven by the motor responsive to actuation of the motor start switch to actuate the motor power switch and thereafter to maintain the motor power switch actuated until a film unit has been processed by the film unit processing means, whereby the motor is maintained powered for processing of a film unit after the shutter means has been moved by the shutter recock means for its run down position, the motor start switch being no longer actuated.

In preferred embodiments, the camera has a battery, the motor being connectable to the battery, and the motor power switch is actuatable by the cycle cam to connect the battery and the motor. The camera further has a shutter housing providing shutter means movable between a cocked position in which exposure can be initiated and a run down position in which exposure is terminated. The shutter housing also provides biasing means biasing the shutter means to its run down position, mechanical release means for releasing the shutter means from its cocked position, shutter recock means driven by the motor for removing the shutter means from its run down position to its cocked position, and a motor start switch actuated by the shutter means at its run down position to connect the battery and the motor. The motor is maintained connected with the battery for powering the processing of a film unit after the shutter means has been moved by the shutter recock means from its run down position, the motor start switch being no longer actuated.

Other objects, features, and advantages will appear from the following description of a preferred embodiment of the invention, taken together with the attached drawings thereof, in which.

Figure 13:
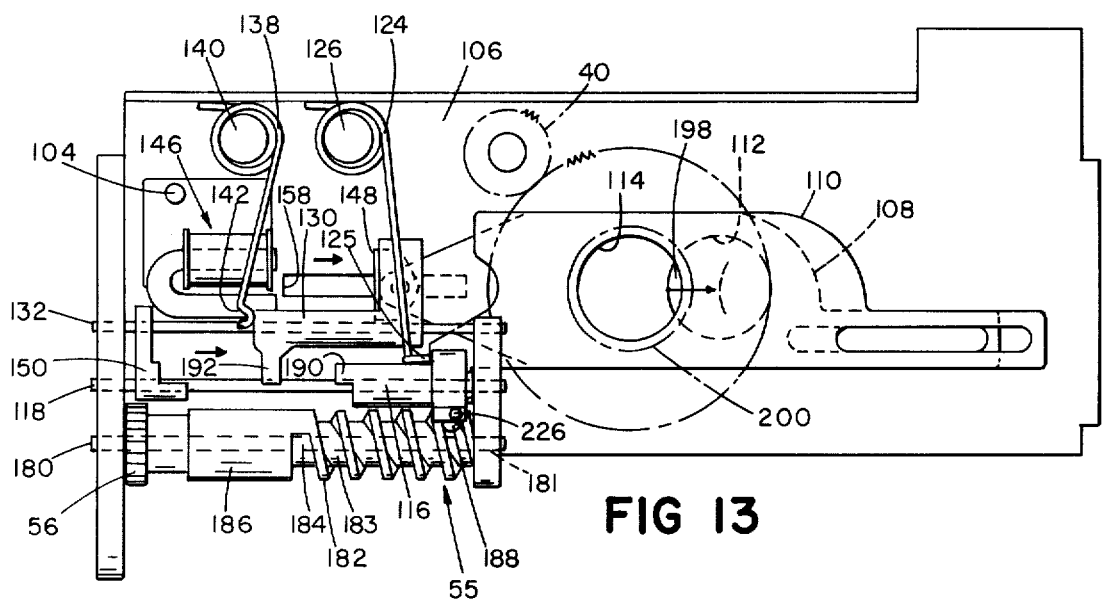
Figure 14:
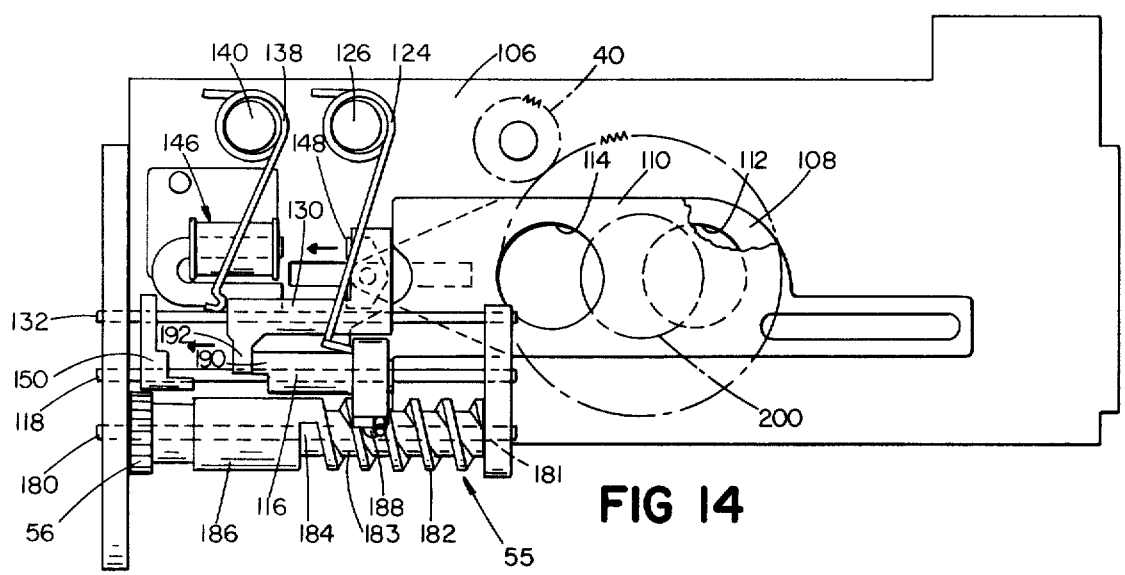
Figure 15:
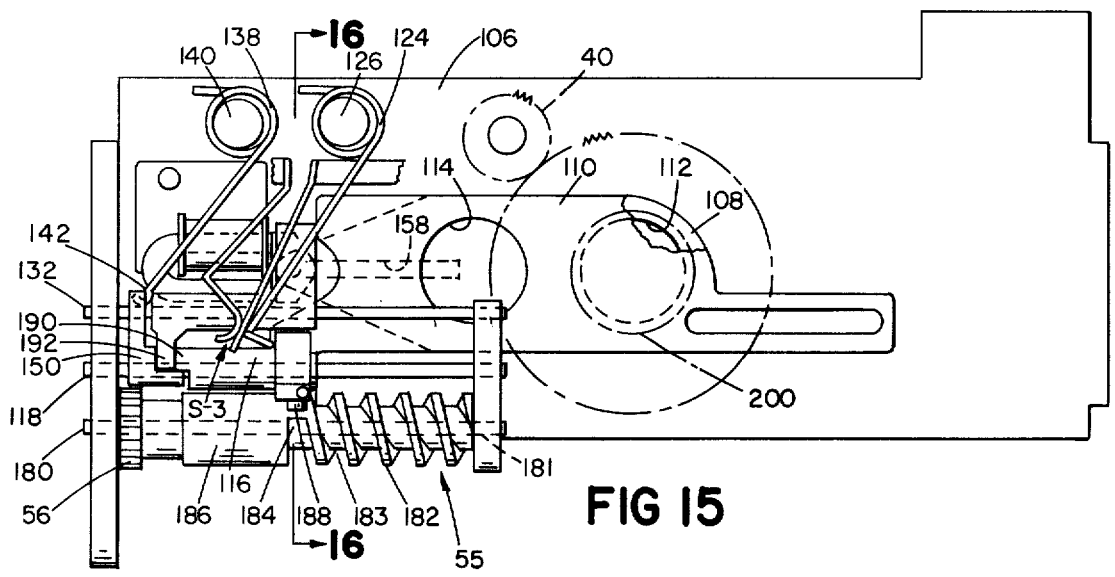

FIGS. 13, 14, and 15 are views of the shutter recock mechanism at different stages of its operation;

FIG. 16 is a view, partly in section, taken on the lines 16—16 of FIG. 15;

FIG. 17 is an exploded view of the film counter mechanism;

FIG. 18 is a detailed view of the counter wheel; and

Figure 2:
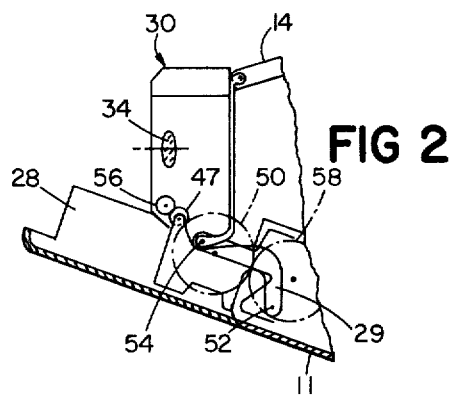
FIG. 2 is a schematic detail view of a portion of the camera of FIG. 1, with the access door closed and the exposure housing erect.
Figure 4:
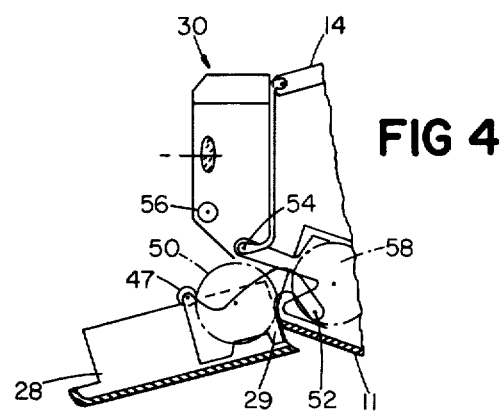
FIG. 4 is a schematic detail view of the same portion in the position of FIG. 1.
Figure 3:
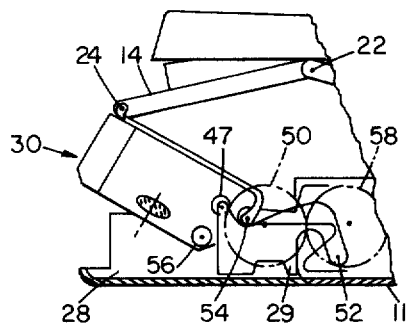
FIG. 3 is a schematic detail view of the same portion with access door closed and exposure housing partly collapsed.
Figure 19:
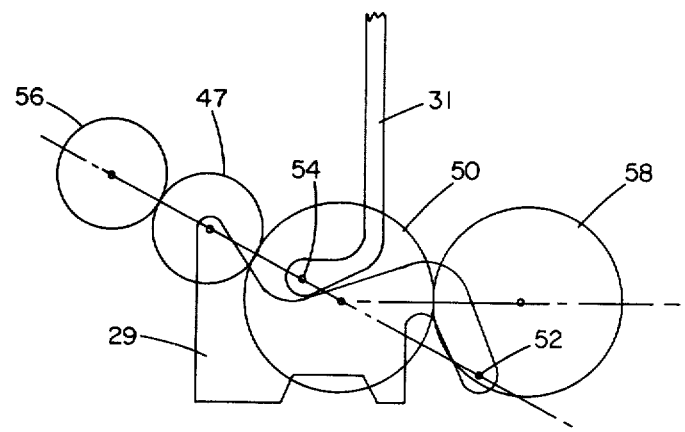
Figure 20:
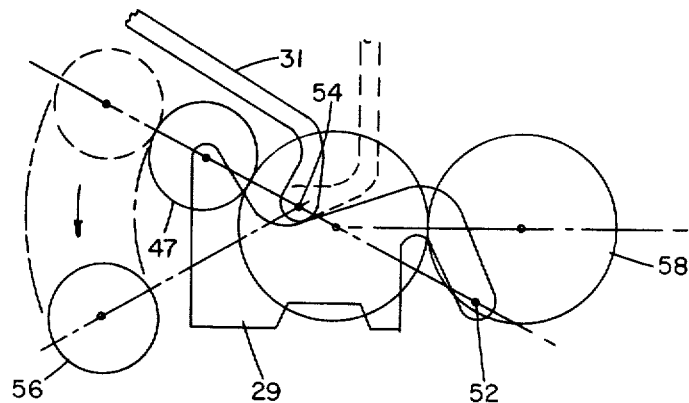
Figure 21:
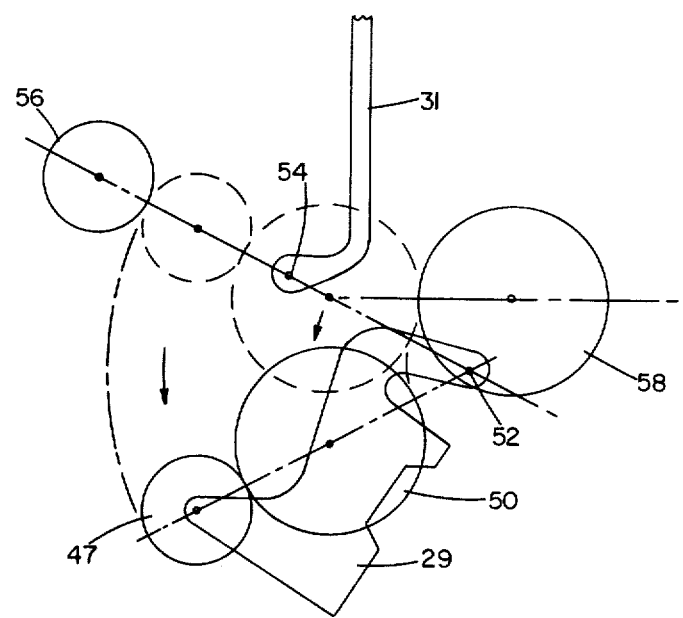

FIGS. 19, 20 and 21 are further detailed views of the camera portions seen in FIGS. 2, 3 and 4.

Figure 1:
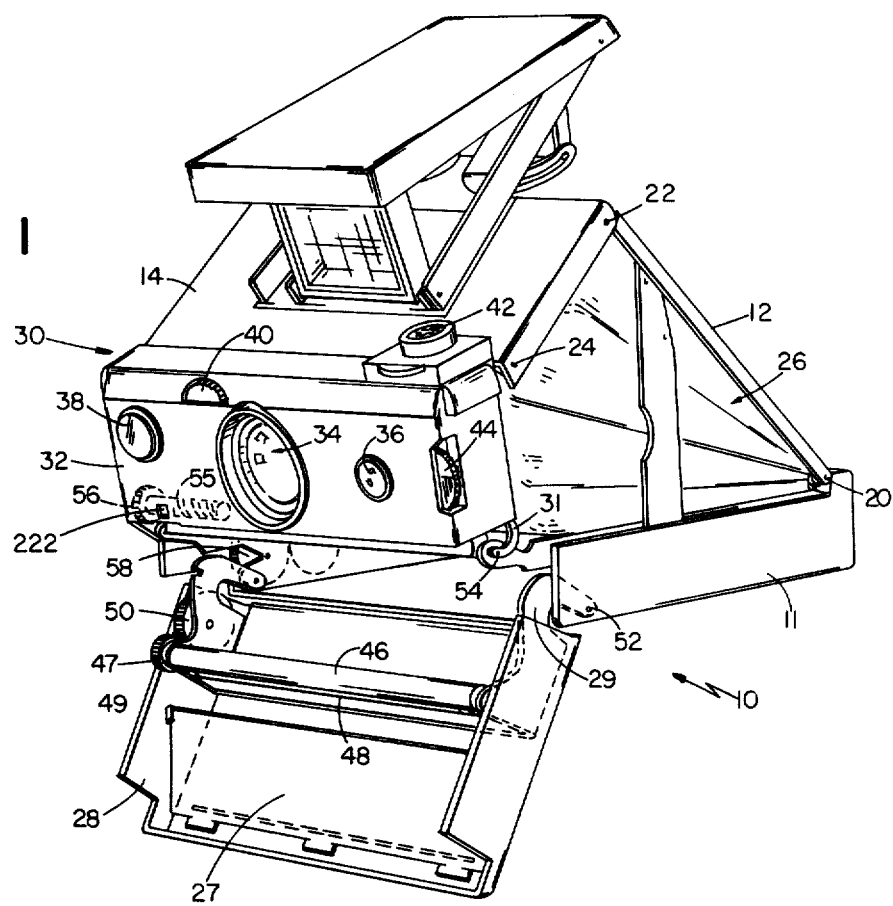
FIG. 1 is a perspective view of the exterior of a camera constructed according to the present invention, with the access door open to permit loading of a film cartridge.

Referring now to the drawings, and particularly to FIG. 1, a collapsible camera 10 has a base 11 supporting walls 12 and 14, and an exposure housing 30 which pivot about axes through points 20, 22, 24 and 54 in order to expand or collapse the bellows 26 and the exposure chamber formed thereby. An access door 28 includes a light shield 27, and pivots downwardly with respect to base 11 into the position seen in FIG. 1 in order to allow a film cartridge (not shown) to be inserted.

The exposure housing 30, erectable with respect to base 11, includes a front cover 32 which carries an exposure lens 34, a counter window 222, and an aperture 36 admitting light to a photosensitive element employed in a timing control circuit of a conventional type. Housing 30 further provides a shutter button 38 which is depressed to initiate exposure of a film unit, a focusing knob 40, a flash unit receptacle 42, and a trim mechanism 44. The shutter mechanism, not visible in FIG. 1, but shown in FIGS. 12 through 15, is carried in exposure housing 30 behind front cover 32. There is a motor at the rear of the camera base, not shown in FIG. 1, but indicated schematically at 60 in FIG. 5, and powered by a battery, which may be provided in the film cartridge or separately.

Exposure housing 30 is hinged by hinge 31 to camera base 11, to pivot about a housing pivot axis through point 54. Access door 28 is hinged by hinge 29 to camera base 11, to pivot about a door pivot axis through point 52. The housing pivot axis is forward of the door pivot axis. A pair of processing rolls 46 and 48 are carried on access door 28 with processing roll gear 47 mounted on roll 46. Roll 48 is turned by friction by roll 46 as a film unit is ejected. Gear 47 engages and is driven by driving gear 50, which is driven through a gear train (not shown) from motor 60. The axis of processing roll gear 47 is forward of the axis of driving gear 50, which is forward of the door pivot axis. A worm 55, indicated in phantom in FIG. 1, and to be described in more detail in what follows, is located behind front cover 32 and forms part of a motor-driven shutter recock mechanism, driven through gear 56, which is engageable with gear 47, in a manner to be described. The axis of gear 56 is forward of the axis of processing roll gear 47.

Referring now to FIGS. 2, 3 and 4, and to FIGS. 19, 20 and 21, FIGS. 2 and 19 show a portion of camera 10 in operating condition with exposure housing 30 erect and access door 28 closed. In this position, the axes of gears 56, 47, 50, and the pivot axes through points 52 and 54 all lie in a common plane. In FIGS. 3 and 20, exposure housing 30 is pivoted forward about the axis through point 54, to collapse the camera, while access door 28 remains closed. Gear 56 has been carried with housing 30 out of engagement with gear 47, which is carried on access door 28 and is driven by gear 50. In FIGS. 4 and 21, exposure housing 30 remains erect, while access door 28 is partly dropped forward, pivoting about the axis through point 52. Gears 47 and 50 are carried forward with access door 28, and as a result gear 47 is disengaged from gear 56, carried on exposure housing 30. Gear 50 is also disengaged from the final or output gear 58 of the gear train that is driven by the motor 60.

Because the axes of gears 56, 47 and 50 and the axes through pivot points 54 and 52 all lie in a common plane in the camera operating condition, during the collapse and erection of housing 30 or the opening and closing of access door 28 the gears more smoothly into and out of engagement with each other. The gears approach each other most closely when the centers are aligned. In all other positions the gears are farther apart than when the axes are aligned in a common plane.

Electrical Connections

Figure 5:
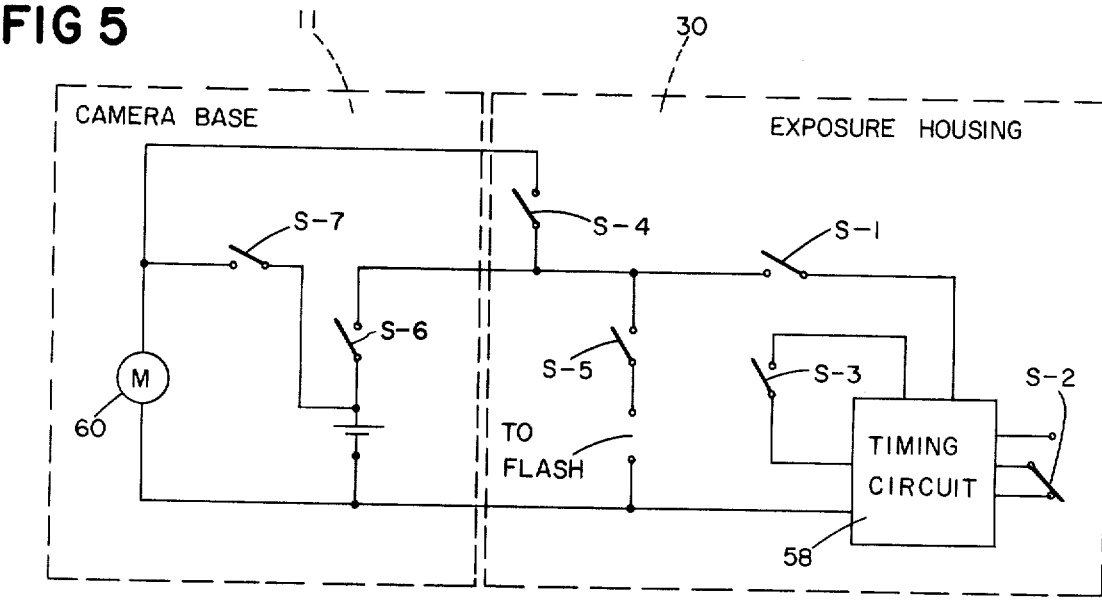
FIG. 5 is a schematic diagram of the electrical circuitry of the camera according to the present invention.

FIG. 5 is a schematic diagram of the electrical connections and switches of the camera according to the present invention.

In order to permit any operation of the camera circuitry, switch S-6 must be closed. This switch is closed only when access door 28 is closed and shutter housing 30 is erect, defining the operating condition of the camera. Both conditions must be met, as will be described more in detail in connection with FIGS. 6–11.

Switch S-2 is actuated by the insertion of a flash cube into receptacle 42 of the camera (FIG. 1). This switch indicates either flash or ambient light conditions for the exposure, and the condition of the switch is sensed in the timing circuit 58, which is of conventional design and will not be described in detail.

Switch S-1 is closed when the operator depresses shutter button 38 (FIG. 1), and powers timing circuit 58. Depression of button 38 also mechanically releases the shutter opening blade actuator, as will be described in more detail in connection with FIG. 12; the motion of the actuator opens switch S-3, which in the cocked position of the shutter mechanism is closed to short out the timing capacitor (not shown) in circuit 58. Further motion of the opening blade actuator closes switch S-5, which fires the flash bulb.

After a time interval determined in a conventional manner by the timing circuit 58, the closing blade actuator is released, as will be described in more detail in connection with FIG. 12. Motion of the closing blade actuator closes motor start switch S-4, which connects motor 60 into the circuit. Motor 60 drives a gear train including a gear 62 (FIG. 8) on which is mounted a cycle cam 64. Motor power switch S-7 is closed by cycle cam 64 when motor 60 is started by motor start switch S-4, and remains closed until the cycle is completed, which requires one rotation of cam 64. During the cycle, the shutter mechanism is recocked under power from motor 60, as will be more fully described, and switch S-4 is therefore opened as the closing blade actuator is retracted to a cocked position. However, since switch S-7 remains closed until the end of the rotation of the cycle cam, motor 60 remains connected into the circuit, and continues to power the processing rolls 46 and 48 until the exposed film unit is ejected from the camera.

Referring now to FIGS. 6 through 11, switch S-6 (schematically indicated in FIG. 5) is the "camera standby" switch that must be closed in order to operate the camera. This switch is closed only when the access door 28 is closed and the shutter housing 30 is erect.

Figure 7:
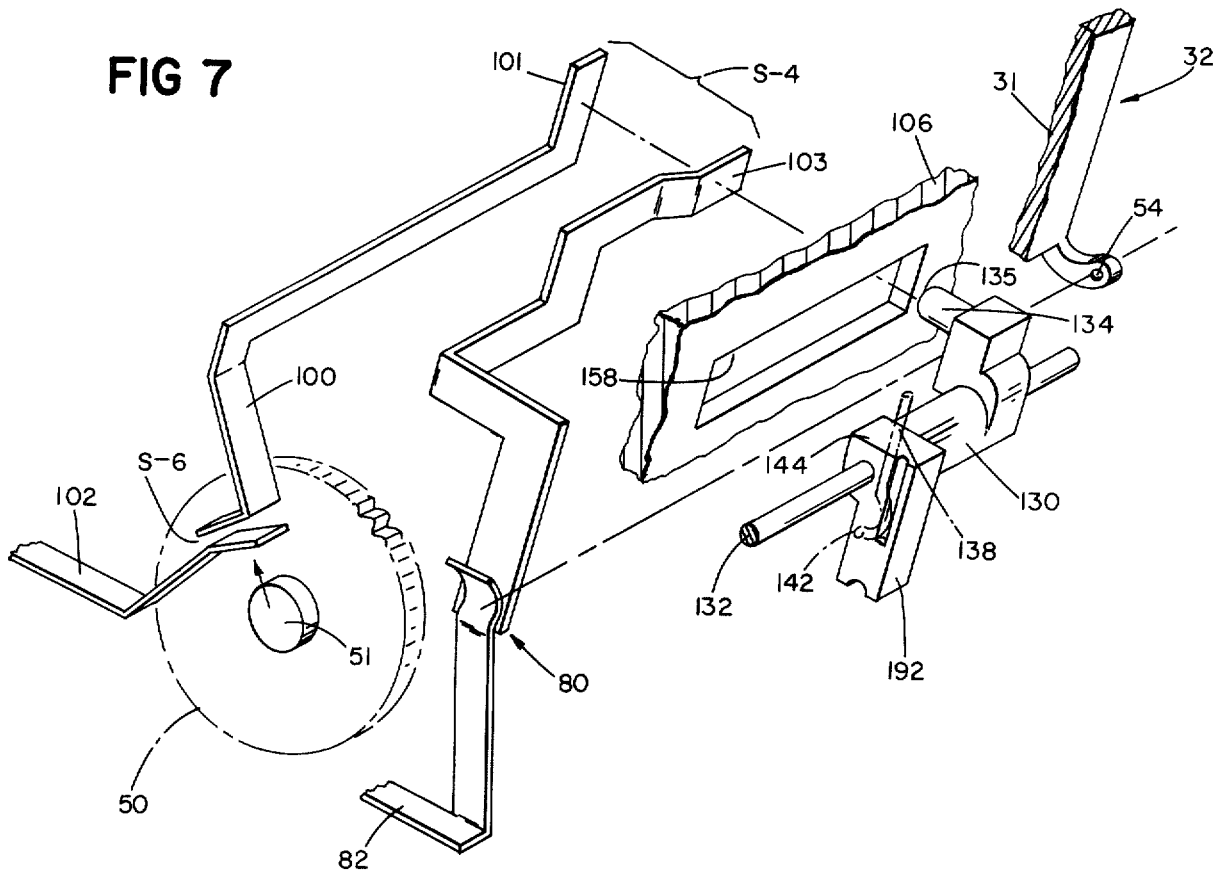
FIG. 7 is an exploded detailed view including the portions of the electrical circuitry visible in FIG. 6.
Figure 8:
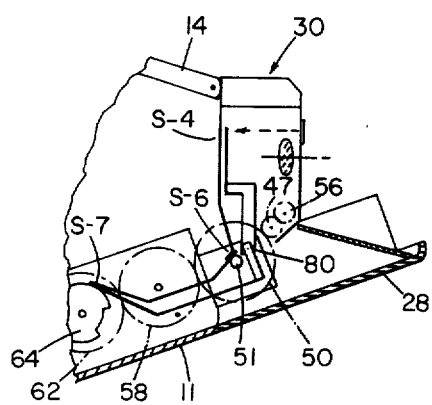
FIGS. 8, 9, 10 and 11 are schematic views including the portions of the electrical circuitry visible in FIG. 6, shown in four different positions of the camera.
Figure 9:
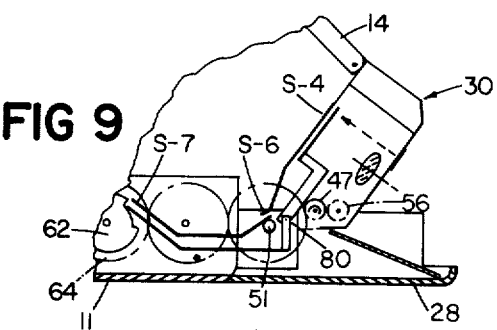
Figure 10:
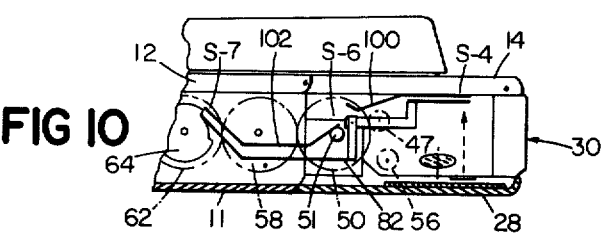
Figure 11:
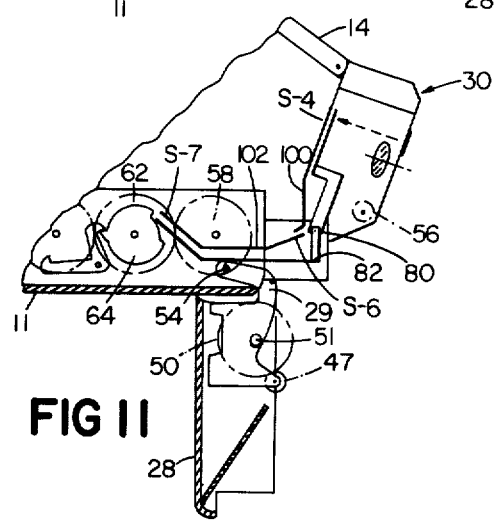

Switch S-6 is composed of two leaf contacts 100 and 102. Leaf 100 is carried on exposure housing 30, while leaf 102 is carried on the camera base 11 and is biased downwardly, away from leaf 100. As seen in FIG. 7 or FIG. 8, when access door 28 is closed and exposure housing 30 is erect, a hub 51 carried on driven gear 50 (carried on access door 28) urges leaf 102 upward into contact with leaf 100. FIG. 11 shows access door 28 dropped forward to permit loading of a film cartridge; in this position, hub 51 on driven gear 50 is out of contact with leaf 102 and the leaves 100 and 102 of switch S-6 do not engage one another, even though exposure housing 30 is erect. In FIG. 9, access door 28 is closed, but exposure housing 30 is partially collapsed. In this position, even though hub 51 on driven gear 50 urges leaf 102 upward, leaf 100 is carried by housing 30 out of engagement with leaf 102, and switch S-6 is therefore open. FIG. 10 shows the switch S-6 in the condition in which the camera is completely collapsed and folded for carrying or storage.

Shutter Recock Mechanism

Figure 12:
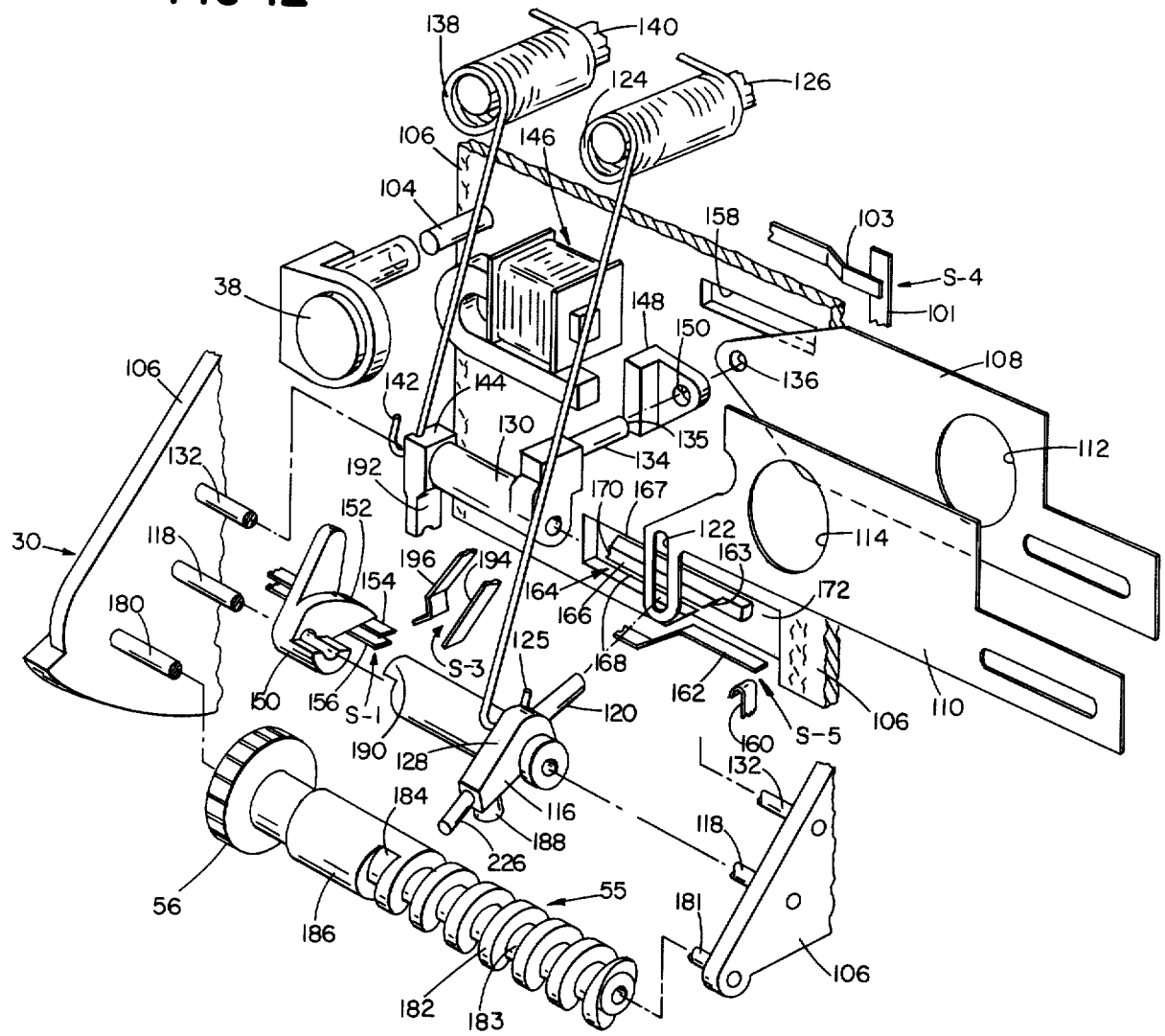
FIG. 12 is an exploded detailed view of the shutter mechanism of the camera, including the recock mechanism.

Referring now particularly to FIG. 12, the shutter mechanism of the camera is mounted in exposure housing 30 behind front cover 32 (not shown in FIG. 12) and comprises generally two slidable shutter blades, an opening blade 110 and a closing blade 108. In the cocked (pre-exposure) condition of the shutter housing, as seen in FIG. 15, the shutter blades have been drawn, against biasing means to be described, into a position in which aperture 112 in closing blade 108 is in the light path between exposure lens 34 and the film to be exposed, while aperture 114 in opening blade 110 is not so aligned. The light path to the film is therefore blocked by blade 110. When the operator depresses shutter button 38, opening blade 110 is mechanically released and moves into a run down position in which aperture 114 is aligned with aperture 112 of blade 108, permitting the film to be exposed; when the exposure is complete, closing blade 108 is released and moves into a run down position in which its aperture 112 is no longer aligned with the light path, terminating the exposure. This is the run down condition of the shutter mechanism.

More in detail, blades 108 and 110 slide in guide mechanisms (not shown) in front of interior wall 106 of housing 30. Opening shutter blade 110 is moved by an opening blade actuator 116, which slides and rotates upon a guide shaft 118 fixed to housing 30. Blade pin 120 of opening blade actuator 116 engages an elongated slot 122 in opening blade 110, and as actuator 116 slides along shaft 118, blade 110 is moved with it. A spring 124, mounted on hub 126 (FIG. 13), provides an end 125 that bears on shoulder 128 of actuator 116, and thereby biases the actuator to the right as seen in FIG. 12, in which the opening blade is in the exposure position.

Closing shutter blade 108 is moved by a closing blade actuator 130, which slides upon a guide shaft 132, fixed to housing 30. Actuator 130 provides a blade pin 134 which engages an aperture 136 in closing blade 108, so that, as actuator 130 slides along shaft 132, blade 108 is moved with it. A spring 138, mounted on hub 140 (FIG. 13), provides an end 142 that bears on shoulder 144 of actuator 130, and thereby biases the actuator to the right as seen in FIG. 12, in which the closing blade is in the exposure terminating or closed position.

Springs 124 and 138 together bias the shutter mechanism into its run down condition.

An electromagnet 146, forming part of the conventional timing circuit 58 (FIG. 5) which is not described here in detail, retains a keeper 148 when the electromagnet is energized (after switch S-1 is closed). Blade pin 134 of closing blade actuator 130 extends through an aperture 150 in keeper 148 to aperture 136 in closing blade 108. End 135 of blade pin 134 extends through aperture 136. Motor start switch S-4, comprising leaf contacts 101 and 103, is located behind aperture 136. At the right-most position of actuator 130, end 135 cams leaf 103 into contact with leaf 101 to close normally open switch S-4, which starts motor 60.

Switch S-4 is also seen in the exploded view of FIG. 7. As best seen in FIG. 11, switch S-4 moves with exposure housing 30, and leaf 103 is connected through a wiper contact at 80 to a conductor 82 fixed with respect to camera base 11. Wiper contact 80 is on the axis extending through housing pivot point 54 of hinge 31. Hence, as housing 30 moves with respect to camera base 11, a connection is maintained from leaf 103 of motor start switch S-4 to conductor 82, leading to the battery and motor 60.

Referring again to FIG. 12, a release lever 150 is rotatable upon shaft 118 and is engageable with opening blade actuator 116. Release lever 150 rotates in response to depression of shutter button 38, and provides a cam portion 152 which urges together leaf spring contacts 154 and 156 of switch S-1 to energize the timing circuit 58 (FIG. 5). Since contacts 154 and 156 are biased apart, they provide an outward or return bias for shutter button 38.

An actuator guide track, generally indicated at 164, is provided in interior wall 106 (behind shutter blades 108 and 110) to guide the motion of blade pin 120 of opening blade actuator 116. A raised central boss 166 divides the track generally into a first track portion comprising an upper straight run 167 and a second track portion comprising a lower straight run 168. A concavely curved end 170 on boss 166 defines a detented position for blade pin 120. A leaf spring contact 162 fits into notch 163 of boss 166 and is biased upwardly. Contact 162 together with contact 160 comprises flash bulb firing switch S-5 seen also in FIG. 5.

In operation of the shutter mechanism as thus far described, the operator depresses shutter button 38. This causes rotation of release lever 150 about shaft 118; cam end 152 of release lever 150 closes contacts 154 and 156 of switch S-1 to energize the timing circuit 58 (FIG. 5), including electromagnet 146. Keeper 148 is retained by the energized electromagnet, thereby retaining closing blade 108 in its cocked position against the bias of spring 138. Further rotation of release lever 150, as button 38 is depressed, rotates opening blade actuator 116 on shaft 118. Blade pin 120 of the actuator is initially (in the cocked condition of the shutter mechanism) in the detented position, in which the end of pin 120 rests against concavely curved end 170 of boss 166 of track 164. Rotation of actuator 116 pivots blade pin 120 downwardly, out of the detented position. Thereafter, under the bias of spring 124, actuator 116 travels to the right as seen in FIG. 12, thereby moving opening blade 110 toward the exposure position. During travel of the actuator, blade pin 120 initially opens the S-3 switch as the pin rides in the lower straight run 168 of track 164, above leaf spring contact 162 of switch S-5. As actuator 116 moves to the right, pin 120 urges leaf contact 162 downwardly into contact with leaf 160, to close switch S-5 and thereby to fire the flash bulb. At the right end 172 of track 164, leaf spring contact 162 urges blade pin 120 upwardly toward the upper straight run 167 of track 164.

Thereafter, when timing circuit 58 determines that the film has been exposed to sufficient light, electromagnet 146 is de-energized and releases keeper 148. Closing blade actuator 130 is thereby freed to move to the right as seen in FIG. 12 under the bias of spring 138, carrying closing blade 108 with it. The shutter mechanism is now in its run down condition. The end 135 of blade pin 134 extending through slot 158 in interior wall 106 closes contacts 101 and 103 of motor start switch S-4 at the extreme rightward point of the travel of the actuator.

This terminates the exposure phase of the operation of the camera, and intitiates the film processing and shutter recock phase.

Referring again to FIGS. 6 and 12, the motor-driven shutter recock mechanism will be described.

A worm 55, indicated in phantom in FIG. 1, is journaled at 180 and 181 on housing 30 and is driven through gear 56, which is engageable with gear 47, driven through gear 50 by motor 60 (FIG. 6), when housing 30 is erect and access door 28 is closed. Worm 55 provides a portion having a single-turn worm 182 defining a helical track 183 that terminates in a ramp portion 184, leading up to a smooth cylindrical portion 186, of greater diameter than track 183.

A follower 188 of opening blade actuator 116 is configured for engagement with the worm track 183.

During exposure, when blade pin 120 of actuator 116 reaches the right hand end 172 of track 164, leaf spring contact 162 of the S-5 switch urges pin 120 upwardly into upper straight run 167. This causes actuator 116 to pivot on shaft 118 and causes follower 188 to drop into helical track 183 of worm 55. When closing blade actuator blade pin 134 closes motor start switch S-4, the motor drives the gear train of camera 10 and through it drives gear 50, which engages and drives gear 47 (concentric with processing roll 46) to process and eject the exposed film unit from the camera. Gear 56 engages gear 47 and is driven thereby to rotate worm 55. Follower 188 travels in helical track 183 and is carried to the left as seen in FIG. 12. Blade pin 120 travels in the upper straight run 167 of track 164, thereby maintaining actuator 116 pivoted, which maintains follower 188 in track 183.

Follower 188 travels in helical track 183 until it is carried up ramp portion 184. When follower 188 reaches this position, actuator 116 pivots on shaft 118 and engages release lever 150, which further rotates actuator 116 until follower 188 is disengaged from worm 55 by the spring action of switch S-1. In this position of actuator 116, blade pin 120 rests against the curved, detent end 170 of boss 166 and the actuator is held in the detented position. Hence, release lever 150, curved end 170 of boss 166, and the leaf spring contacts of switch S-1 define actuator detent means.

As actuator 116 is carried by worm gear 55 to the left as seen in FIG. 12, shoulder 190 of opening blade actuator 116 bears against dependent lug 192 of closing blade actuator 130 and carries actuator 130 to the left. This recocking travel of actuators 116 and 130 carries the two shutter blades 110 and 108 to their cocked position. At the end of the recocking travel, when actuator 116 has reached its detented position, the shutter mechanism is held in its cocked condition.

As actuator 130 travels to the left during the recock motion, motor start switch S-4 is allowed to open. However, as previously discussed in connection with FIG. 5 and FIGS. 8 through 11, when the motor is initially started, it rotates gear 62, on which is mounted cycle cam 64, which closes motor power switch S-7. Switch S-7 remains closed until the end of the revolution of the cycle cam, thereby maintaining motor 60 connected to the battery despite opening of switch S-4.

In the left-most (cocked) position of actuator 116, spring 124 closes leaf contacts 194 and 196 comprising switch S-3 (best seen in FIG. 15). This switch, as indicated schematically in FIG. 5, shorts out the timing capacitor (not shown) in timing circuit 58 until shutter button 38 is depressed and actuator 116 is thereby released, opening switch S-3.

The shutter blade movement will now be further described with regard to FIGS. 13, 14 and 15 which illustrate three successive positions of the shutter mechanism.

In FIG. 13, opening blade actuator 116 has reached its right-most position after release. Closing blade actuator 130 is still traveling, and blade apertures 112 and 114 still overlap slightly at 198. Follower 188 on opening blade actuator 116 has dropped into helical track 183.

FIG. 14 shows the shutter mechanism after closing blade actuator 130 has reached its right-most position, closing motor start switch S-4 and initiating the recock process. Worm 55 has carried opening blade actuator 116 partway to the recocked position, and actuator 116 has in turn carried closing blade actuator 130 partway to the recocked position.

In FIG. 15, the shutter mechanism has reached its cocked condition. The leaf contacts of capacitor shorting switch S-3 are shown in this Figure, the switch being closed by actuator 116 to short out the timing capacitor.

FIG. 16 shows the three different orientations of opening blade actuator as it pivots about shaft 118. In the FIRE position, blade pin 120 travels in lower straight run 168 of track 164. During the recock operation, blade pin 120 travels in upper straight run 167 and is in the position labeled RECOCK. Finally blade pin 120 reaches the DETENT position in which the pin rests against curved end 170 of guide portion 166.

Film Counter and Flash Fire Inhibit

The film counter mechanism will be described with particular reference to FIGS. 16, 17 and 18. The counter described is for use with a film cartridge initially including ten film units.

Figure 6:
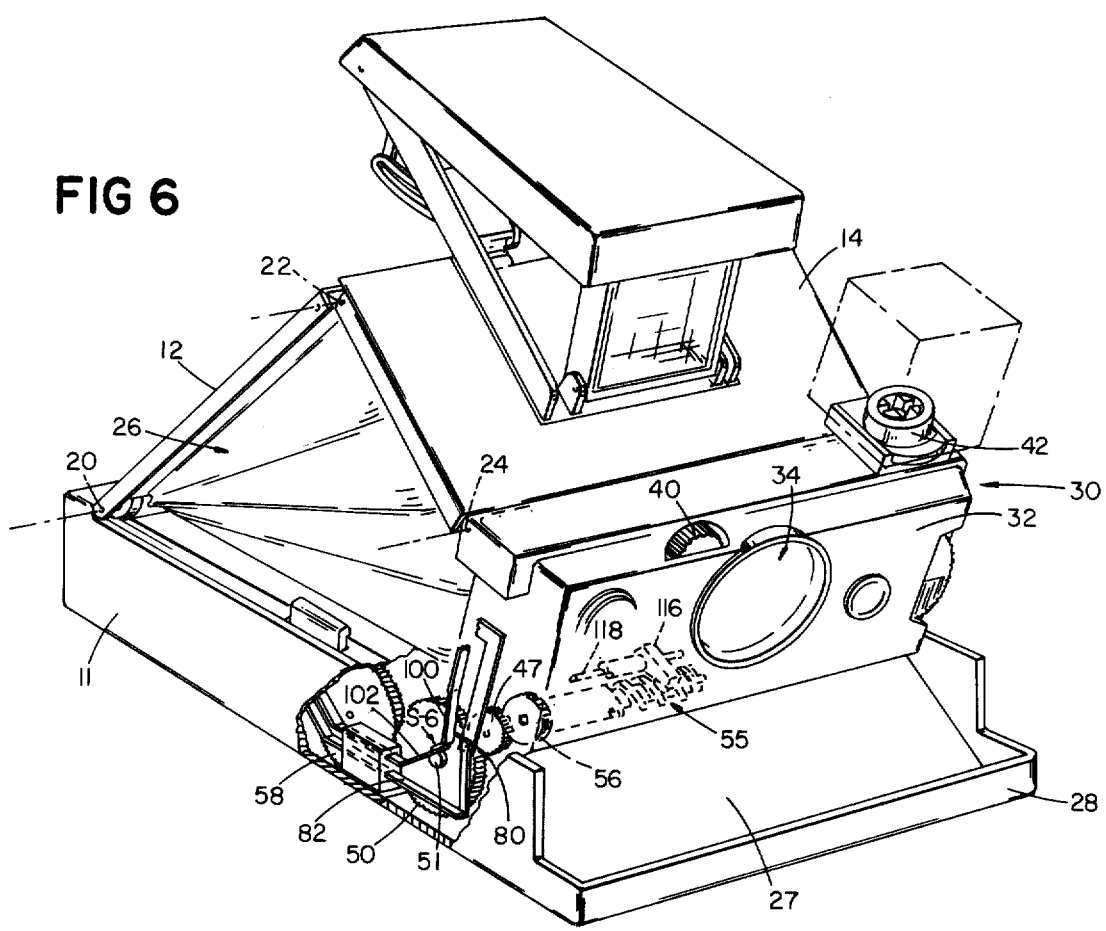
FIG. 6 is a perspective view of the camera according to the present invention, with portions broken away to expose part of the electrical circuitry.

FIG. 17 shows the inner surface of a portion of front cover 32 of exposure housing 30, whose outer surface is seen in FIGS. 1 and 6. Cover 32 provides aperture 200 for exposure lens 34 and aperture 202 for shutter button 38. Further, cover 32 provides a guide track 204, recessed in the cover, that runs generally parallel with track 164 in interior wall 106 of exposure housing 30. Track 204 includes an upper straight run 206 and a lower straight run 208, with a connecting vertical portion 210.

A toothed counter wheel 212 is secured to cover 32. FIG. 13 shows the front surface of counter wheel 212. Wheel 212 provides ten teeth 214 and an eleventh retainer tooth 218. Each tooth provides a bevel edge 215 to permit motion of wheel 212 in a manner to be described. Tooth 218 provides a retainer hook 220 partially enclosing a space 219. The front surface of wheel 212 is provided with symbols associated with the teeth and including the digits from 1 to 9, together with the letters "L" (load), "E" (empty) and a directional arrow.

Wheel 212 is mounted on cover 32 in wheel housing 223, for rotation about a pin 227. Pawl 225 constrains wheel 212 to rotate clockwise as seen in FIG. 17. When wheel 212 is mounted on front cover 32, one symbol at a time is visible through counter aperture 222 in front cover 32 (also seen in FIG. 1). A housing apron 224, which is made of a flexible material, extends slightly below the lower edge of cover 32 and, for reasons to be later explained, one of the eleven teeth also extends slightly below the lower edge of cover 32.

Opening blade actuator 116 provides a wheel advance pin 226 which, when cover 32 is in place on housing 30, travels in guide track 204 on the inside surface of cover 32. As is seen in FIG. 16, when actuator 116 is initially released to initiate a film exposure, blade pin 120 travels in the lower straight run 168 of track 164 (FIRE). At the same time, wheel advance pin 226 travels in the upper straight run 206 of track 204 in cover 32. When actuator 116 reaches its furthest position in its exposure travel (FIG. 13) leaf spring contact 162 urges blade pin 120 upwardly into the upper straight run 167 of track 164. This motion pivots follower 188 downwardly into helical track 183 of worm 55, and at the same time moves wheel advance pin 226 downwardly through portion 210 of track 204. During recock of the shutter mechanism, blade pin 120 travels in upper straight run 167 of track 164, while wheel advance pin 226 travels in the lower straight run 208 of cover track 204.

At the end of the recock travel, as actuator 116 is pivoted into the detented (cocked) position, wheel advance pin 226 moves upwardly in portion 211, engaging a tooth 214 of counter wheel 212 and rotating wheel 212 thereby, to display a digit lower by one than that previously displayed. In the cocked condition of the camera, the counter wheel displays through counter aperture 222 the number of film units remaining for exposure, and the shutter mechanism is cocked for the next exposure.

Film Loading

When the last film unit has been ejected, and wheel 212 has rotated to bring the symbol "E" into view through counter aperture 222, wheel advance pin 226 is retained in space 219, which is partially enclosed by hooked tooth 218. In this position, pin 226 cannot be released for travel in cover track 206, and consequently, opening blade actuator 116 cannot be released to close flash firing switch S-5, and the available flash bulb therefore cannot be fired.

When the operator opens access door 28 to replace the film cartridge, one tooth of wheel 212 is accessible at the lower edge of cover 32. Flexible apron 224 permits the operator's thumb or finger to engage the one tooth that extends below cover 32. Bevel edges 215 of the teeth permit wheel 212 to be turned clockwise as seen in FIG. 17 (as indicated by the directional arrow symbol), past wheel advance pin 226, without firing the camera, until the symbol "L" appears in counter aperture 222. This rotation both releases pin 226 from tooth 220 and by engagement with the next tooth 228, drives the pin 226 upward thereby rotating pin 120 of the detent 170. This fires the shutter. However, since the "standby" switch S-6 is open, the flash will not fire or the motor run. Then, when a new film cartridge is inserted and the door 28 closed, switch S-6 is also closed which, because of the fired position of the shutter (S-4 is closed), starts the motor thereby ejecting the uppermost film unit or dark slide and recocking the shutter. In this position of the access door, as seen in FIG. 6, light shield 27 prevents access to counter wheel 212, which can thereafter be advanced only by firing the camera.

What is claimed is:

1. An electrically operable, folding camera comprising:

a base;

a shutter housing mounted on said base for movement between an erect position wherein said camera may be rendered operative and a collapsed condition for compact camera storage;

an access door mounted on said base for movement between a closed position wherein said camera may be rendered operative and an open position for insertion and removal of film material from said camera; and means selectively operative in response to the position of both said housing and said door for conducting electrical power between said base and said shutter housing, said conducting means including a single switch arrangement comprising a first electrically conductive element mounted to said base, a second electrically conductive element mounted to said shutter housing and a member on said door to be automatically engaged with and disengaged from one of said electrically conductive elements as said door is displaced between its said open and closed positions, said single switch arrangement being structured and arranged so that said electrically conductive elements are disposed out of electrical contact when said shutter housing is not erected whether said door is in its said open or closed position, so that said electrically conductive elements are disposed out of electrical contact when said door is in its said closed position with said shutter housing disposed in its said erect position and so that said electrically conductive elements are disposed in electrical contact only when said shutter housing is in its said erect position with said door in its said closed position.

2. The camera of claim 1 wherein said first conductive element is mounted on said base and said second conductive element is mounted on said housing such that when said housing is erect and said access door is closed, said conductive elements are in contact with each other and when said housing is displaced from its said erect position to its said collapsed position, said first element is displaced out of contact with said second element to thereby render said switch arrangement nonconductive.

3. The camera of claim 2 wherein said switch arrangement includes means for biasing at least one of said conductive elements away from the other of said elements and said access door includes means operative when said access door is in its said closed position for urging said one conductive element into engagement with said other conductive element when said housing is in its said erect position.

4. The camera of claim 2 wherein said shutter housing is pivotally mounted on said base near a given end thereof for pivotal movement in a given direction from its said collapsed position to its said erect position for rendering said camera operable, said access door is pivotally mounted on said base near said given end thereof for pivotal movement in said given direction from its said open position to its said closed position for rendering said camera operable, said conductive elements being mounted on said housing and said base such that said second conductive element is displaced from a remote point to a position closely spaced to said first conductive element by movement of said housing toward its said erect position and said second conductive element is urged by said door toward said position of and contact with said second conductive element by movement of said door toward its said closed position.

5. The camera of claim 2 wherein said first conductive element is spring biased away from said second conductive element.

6. A folding camera comprising:
a base having a forward portion;
a film compartment located on said base;
a motor;
an output gear mechanism mounted on said base in driving connection to said motor;
a film loading door mounted to said forward portion of said base for pivotal movement around a door pivot axis between an open position, permitting insertion and removal of film material into said film compartment, and a closed position for camera operation;
actuatable means for advancing film material from said film compartment, said means for advancing film including a gear arrangement mounted on said door so as to be in driving engagement with said output gear mechanism when said door is in its said closed position, said gear arrangement having a film drive gear mounted on said door with the axis of said film drive gear spaced from said door pivot axis;
a shutter housing mounted to said forward portion for pivotal movement around a shutter housing pivot axis between an erect position for camera operation and a collapsed position for compact storage;
a shutter mechanism mounted in said shutter housing;
actuatable means mounted in said shutter housing for recocking said shutter mechanism, said recocking means including a shutter drive gear mounted so as to be in driving engagement with said film drive gear when said housing and door are in their erect and closed positions respectively, said shutter drive gear having its axis spaced from said shutter housing pivot axis; and
said door pivot axis, said film drive gear axis, said shutter housing pivot axis and said shutter drive gear axis lying in a common plane when said door is in its said closed position and said shutter housing is in its erect position such that said film drive gear and said shutter drive gear are smoothly pivotable into and out of engagement with each other responsive to displacement of said door and said shutter housing.

7. The camera of claim 6 wherein said means for advancing film material includes a film processing roller mounted for rotation on said door, and said film drive gear is coupled in driving connection to one end of said roller.

8. The camera of claim 6 wherein said recocking means includes a worm mechanism mounted for rotation in said shutter housing, and said shutter drive gear is coupled in driving connection to one end of said worm mechanism.

9. The camera of claim 6 wherein said shutter housing pivot axis is intermediate said axis of said film drive gear and said door pivot axis when said camera is in its operating condition.

10. The camera of claim 6 wherein said axis of said film drive gear is forward of said door pivot axis, said axis of said shutter drive gear is forward of said shutter housing pivot axis, and said shutter housing pivot axis is intermediate said axis of said film drive gear and said door pivot axis when said camera is in its operating condition.

11. A folding camera comprising:
a base having a forward portion;
a film compartment located on said base;
a motor carried on said base;
an output gear mechanism mounted on said base in driving connection to said motor;
a film loading door mounted to said forward portion of said base for pivotal movement around a door pivot axis between an open position, permitting insertion and removal of film material into said film compartment, and a closed position for camera operation;
actuatable means for advancing film material from said film compartment, said means for advancing film including a gear arrangement mounted on said door so as to be in driving engagement with said output gear mechanism when said door is in its said closed position, said gear arrangement having a film drive gear mounted on said door with the axis of said film drive gear forward of said door pivot axis;
a shutter housing mounted to said forward portion for pivotal movement around a shutter housing pivot axis between an erect position for camera operation and a collapsed position for compact storage;
a shutter mechanism mounted in said shutter housing;
actuatable means mounted in said shutter housing for recocking said shutter mechanism, said recocking means including a shutter drive gear mounted so as to be in driving engagement with said film drive gear when said housing and door are in their erect and closed positions respectively, said shutter drive gear having its axis forward of said shutter housing pivot axis and forward of said axis of said film drive gear; and
said door pivot axis, said film drive gear axis, said shutter housing pivot axis and said shutter drive gear axis lying in a common plane when said door is in its said closed position and said shutter housing is in its erect position such that said film drive gear and said shutter drive gear are smoothly pivotable into and out of engagement with each other responsive to displacement of said door and said shutter housing.

12. A camera of the type employing a removable film cartridge including a plurality of individual film units, said camera having:
a base including forward and rear portions;
a motor carried on said base;
an output gear mechanism mounted on said base in driving connection to said motor;
an access door coupled to said base forward portion for pivotal movement between an open position permitting insertion or removal of a said film cartridge and a closed position for camera operation;

a shutter mechanism housing pivotably connected to said base forward portion at a housing pivot axis for pivotal movement of said housing between an erect position for camera operation and a collapsed position for storage;

said access door closed position and said shutter mechanism housing erect position together defining a camera operating condition;

a film advance gear arrangement including a processing roll gear mounted on said access door and drivably connected with said output gear when said access door is in its said closed position, said processing roll gear having its axis forward of said door pivot axis;

shutter mechanism recock means carried in said housing and including a recock gear having its axis forward of said housing pivot axis and of said processing roll gear axis, said recock gear being drivably engaged with said processing roll gear when said camera is in its operating condition with said housing erect and said door closed, and disengaged therefrom when said housing is in its said collapsed position or said door is in its said open position;

said door pivot axis, said housing pivot axis, said processing roll gear axis, and said recock gear axis all lying in a common plane in said camera operating condition;

said recock gear being thereby smoothly pivotable into and out of engagement with said processing roll gear during said pivotal motion of said housing when said access door is in its said closed position; and said processing roll gear being thereby smoothly pivotable into and out of engagement with said recock gear and during said pivotal motion of said access door when said housing is in its said erect position.

13. The camera of claim 12 wherein said film advance gear arrangement includes a driving gear having its axis forward of said door pivot axis and lying in said plane, said driving gear being drivably engaged between said output gear mechanism in said access door closed position, and disengaged therefrom in said access door open position, and said processing roll gear being drivably engaged with said driving gear and having its axis forward of said driving gear axis, and being therethrough drivably engaged with said output gear mechanism in said access door closed position, and disengaged therefrom in said access door open position.

14. A shutter mechanism operative to unblock and block the optical path of a camera to expose film material located at the camera focal plane, said shutter mechanism comprising:

a housing;

a shutter blade mechanism mounted in said housing for displacement along a given blade path between a first arrangement in which film exposure may be initiated and a second arrangement in which film exposure is terminated, said blade mechanism including a follower coupled to said blade mechanism for movement therewith, and means for guiding said follower along spaced, parallel first and second paths respectively as said blade mechanism is displaced from its said first to its said second arrangement and then back to its said first arrangement;

means for biasing said blade mechanism toward its said second arrangement;

means for releasably retaining said blade mechanism in its said first arrangement;

shutter drive means actuatable for displacing said blade mechanism from its said first to its said second arrangement for recocking of said shutter mechanism, said drive means including means positioned along said blade path so as to be disengaged from said follower when said follower is located on its said first path and engaged with said follower when said follower is located on its said second path whereby said blade mechanism is free of said drive means when said blade mechanism moves from its said first to its said second arrangement for providing a film exposure and thereafter is engaged with said drive means for returning said blade mechanism from its said second to its said first arrangement.

15. The shutter mechanism of claim 14 wherein said guide means includes a guide member having an elongated guide loop defined by a pair of spaced apart, elongated tracks aligned in parallel with said blade path and linked at their respective ends by short tracks, said follower includes a first portion in engagement with said guide loop such that said first portion is carried along one of said elongated tracks during movement of said blade mechanism to said second arrangement and along the other of said elongated tracks during movement of said blade mechanism to its said first arrangement, and further includes means for biasing said first portion of said follower from said one elongated track to said other elongated track along one of said short tracks when said blade member reaches its said second arrangement, and said drive means includes a worm mounted along side said blade mechanism so as to be disengaged from said follower when said first portion is located in said one elongated track and to be engaged with said follower when said first portion is displaced to said other elongated track, thereby allowing recocking of said blade mechanism to its said first arrangement following exposure operations.

16. The shutter mechanism of claim 15 wherein said means for retaining said blade mechanism in its said first arrangement includes a detent located in the other of said short tracks, said detent being configured for receiving and releasably retaining said follower first portion when said blade mechanism is in its said first arrangement.

17. The shutter mechanism of claim 16 wherein said shutter drive means includes means for urging said follower out of engagement therewith when said blade mechanism reaches its said first arrangement such that said first portion of said follower is urged out of said other elongated track along said other short track and into said detent.

18. The shutter mechanism of claim 14 wherein said camera is configured for receiving a film cartridge initially including a specific number of film units, and said shutter mechanism includes a counter wheel rotatably mounted in said shutter housing adjacent said follower when said blade mechanism is in its said first arrangement, said wheel providing a plurality of teeth on its perimeter including a retaining tooth, said plurality being a number greater by one than said specific number, said wheel providing visible symbols indicating a film unit count including an initial symbol indicating said specific number and a final symbol indicating an exhausted film cartridge, each said symbol being associated with a said tooth, said housing providing a counter aperture adjacent said wheel for exposing a single symbol to view, said follower further providing a wheel advance pin engageable with a tooth of said wheel to advance said wheel during said recocking displacement of said blade mechanism to its first arrangement, said wheel advance pin being thereafter normally releasable from said tooth engagement responsive to release of said blade mechanism for its said exposure displacement, said final symbol being associated with said retaining tooth such that when the last film unit in said cartridge is exposed, said wheel advance pin engages said retaining tooth to advance said wheel to a position in which said final symbol is visible through said counter aperture, said advance pin being thereafter retained by said retaining tooth, whereby said blade mechanism is prevented from movement responsive to attempted further actuation of said blade mechanism when said film cartridge is exhausted.

19. The shutter mechanism of claim 18 wherein said camera includes means for receiving a flash assembly and means responsive to displacement of said blade mechanism toward its said second arrangement for firing a flash of said flash assembly whereby said retaining tooth prevents wasteful firing of said flash assembly responsive to attempted further actuation of said blade mechanism when said film cartridge is exhausted.

20. The shutter mechanism of claim 18 including means actuatable for urging said follower first portion into said first path to release said blade mechanism to its said second position and thereby to provide a film exposure.

21. The shutter of claim 20 wherein said urging means includes a manually displaceable member mounted for movement into engagement with said follower for urging said follower first portion into said first path.

22. In a camera of the type employing a removable film cartridge including a plurality of individual film units, said camera having:
  a shutter housing;
  a shutter mechanism mounted in said shutter housing and including:
    a shutter blade mechanism and a shutter blade actuator connected to said shutter blade mechanism, said shutter blade mechanism and shutter blade actuator being movable between a first position defining a shutter mechanism cocked condition in which film exposure can be initiated and a second position defining a shutter mechanism run down condition in which exposure is terminated; and
    exposure biasing means for biasing said shutter mechanism to its said run down condition;
  mechanical release means mounted on said shutter housing and connected to said shutter mechanism for releasing said shutter mechanism from its said cocked condition, thereby initiating exposure of a film unit;
  a motor;
  a film roller mounted in said camera adjacent said shutter housing and including a gear arrangement, said roller being drivable by said motor through said gear arrangement for advancing an exposed film unit from an exposure position; and
  a motor start switch connected to said motor and actuated by said shutter mechanism when said shutter mechanism is in its said run down condition;
  the improvement wherein;
    said shutter housing provides an actuator guide including first and second parallel track portions, said actuator being engaged with said guide first track portion for exposure travel to said second position and aligned with said second track portion for recock travel to said first position;
    a worm journaled in said shutter housing parallel with said roller;
    a worm drive gear mounted on said worm and engageable with said film roller gear arrangement;
    a follower carried on said shutter actuator and engageable with said worm for recocking travel of said shutter mechanism when said actuator is aligned with said second track portion;
    recock biasing means for biasing said actuator means into engagement with said second track portion and said follower into engagement with said worm at the end of said exposure travel; and
    means mounted on said shutter housing engaging said actuator at the end of said recocking travel for disengaging said follower from said worm gear and for holding said shutter blade actuator means in said first position.

23. In a camera employing a film cartridge providing a dark slide and a predetermined number of film units arranged to follow said dark slide in a predetermined order from first to last, said camera including:
  means for cooperating with said film cartridge for positioning said dark slide in a focal position;
  a shutter mechanism actuatable between a first arrangement for initiating exposure of a given film unit to a second arrangement for terminating exposure of said film unit;
  means for advancing said given film unit from its said focal position following the exposure thereof;
  a first conduit for controlling camera operation during said exposure;
  a second circuit for controlling operation of said advancing means following said exposure;
  selectively operative means for initially actuating said shutter mechanism from said first to said second arrangement;
  means responsive to said initial actuation of said shutter mechanism for energizing said first circuit;
  means responsive to actuation of said shutter mechanism to its said second arrangement for energizing said second circuit so as to advance the exposed film unit from said position;
  a film loading door displaceable between a closed position for camera operation and an open position for permitting insertion into and removal of said film cartridge from said camera;
  means responsive to displacement of said door to its open position for preventing energization of either of said circuits; and
  the improvement comprising:
    means for counting the exposure and advancement of said film units and, responsive to advancement of the last of said film units, for preventing further actuation of said shutter mechanism, said means including means actuatable only upon displacement of said door to its said open position for disabling said preventing means and for actuating said shutter mechanism to its said second arrangement whereby said open door prevents energization of said circuits and, upon insertion of a fresh film cartridge and actuation of said door to its said closed position, said second circuit is automatically energized to advance said dark slide from said focal position thereby bypassing said first circuit.

24. The improvement of claim 23 wherein said camera includes a flash receptacle and said first circuit includes means for flashing a flash unit.

25. A camera comprising:

a housing;

means for receiving a film cartridge having a specific number of film units;

a lens assembly for directing image carrying light rays along a given optical path to a focal plane within said housing;

a shutter mechanism mounted for displacement along a shutter path from a cocked position in blocking relation to said given optical path through an exposure position and ultimately to a shutter run down position in blocking relation to said given optical path;

selectively operative means for actuating said shutter mechanism for displacement from said cocked to said run down position;

means for displacing said shutter mechanism from its said run down position to its said cocked position;

a follower coupled to said shutter mechanism for movement along a given path between a first and a second position as said shutter mechanism is displaced between its said cocked and run down positions; and a counter wheel rotatably mounted in said housing adjacent said follower when said blade mechanism is in its said first position, said wheel providing a plurality of teeth on its perimeter including a retaining tooth, said plurality being a number greater by one than said specific number, said follower further providing a wheel advance pin engageable with a tooth of said wheel to advance said wheel during said recocking displacement of said blade mechanism to its said first position, said wheel advance pin being thereafter normally releasable from said tooth engagement responsive to release of said blade mechanism for its said exposure displacement, said wheel being associated with said follower such that said pin engages said retaining tooth when the last film unit in said cartridge is exposed, said advance pin being thereafter retained by said retaining tooth, whereby said blade mechanism is prevented from movement responsive to attempted further actuation of said blade mechanism when said film cartridge is exhausted.

26. The camera of claim 25 wherein said wheel includes visible symbols indicating a film count including a final symbol associated with said retaining tooth and indicating an exhausted film cartridge, said housing providing a counter aperture for exposing a single symbol.

27. A camera comprising:

a housing configured for receiving self-processing film units;

a lens assembly for directing image carrying light rays along a given optical path to a film unit located at a focal position within said housing;

a shutter mechanism mounted for displacement along a shutter path from a cocked arrangement in blocking relation to said given optical path through an exposure arrangement and ultimately to a shutter run down arrangement in blocking relation to said given optical path;

means for biasing said shutter mechanism for displacement from said cocked to said run down arrangement;

a follower member coupled to said shutter mechanism for displacement therewith from a first to a second position along a path substantially parallel to said shutter path;

means for retaining said follower in its said first position so as to retain said shutter mechanism in its said cocked arrangement;

selectively operative means for releasing said follower from its said first position so as to release said shutter mechanism from its said cocked arrangement a motor;

means driven by said motor and engageable with said follower when said follower is in its said second position for displacing said follower to its said first position thereby displacing said shutter mechanism from its said run down arrangement to its said cocked arrangement against the force of said biasing means;

means including fluid processing rollers driven by said motor for advancing a film unit from said focal position and for processing said film unit; and means responsive to displacement of said shutter mechanism from its said cocked arrangement to its said run down arrangement for coupling said motor to a supply of voltage so as to energize said motor thereby advancing said film and recocking said shutter mechanism.

* * * * *